United States Patent [19]

Tanaka et al.

[11] Patent Number: 5,331,540

[45] Date of Patent: Jul. 19, 1994

[54] SYMBOL DEFINITION SYSTEM AND METHOD A PROGRAMMABLE MACHINE CONTROLLER

[75] Inventors: Kunio Tanaka, Akishima; Yasushi Onishi, Minamitsuru, both of Japan

[73] Assignee: Fanuc Ltd., Minamitsuru, Japan

[21] Appl. No.: 776,222

[22] Filed: Nov. 13, 1991

[30] Foreign Application Priority Data

Mar. 27, 1990 [JP] Japan ................................ 2-77692

[51] Int. Cl.$^5$ .............................................. G05B 19/05
[52] U.S. Cl. ..................................... 364/147; 364/191
[58] Field of Search ............... 364/146, 147, 191, 192, 364/474.23, 474.22

[56] References Cited

U.S. PATENT DOCUMENTS

4,445,169  4/1984  Wakita et al. .

FOREIGN PATENT DOCUMENTS

61-147304  7/1986  Japan .
62-86410   4/1987  Japan .
63-300302  12/1988 Japan .
2-79103    3/1990  Japan .
2-275502   11/1990 Japan .................................. 364/192

OTHER PUBLICATIONS

Patent Abstracts of Japan, vol. 10, No. 188, (P-473) (2244), Jul. 3, 1986 for JP-A-61-033,507 (Toyota Motor Corp.) Feb. 17, 1986.

Patent Abstracts of Japan, vol. 9, No. 2 43 (P-392) (1966), Sep. 30, 1985 for JP-A-60-095,612 (Fanuc K.K.), May 29, 1985.

*Primary Examiner*—Jerry Smith
*Assistant Examiner*—Steven R. Garland
*Attorney, Agent, or Firm*—Staas & Halsey

[57] ABSTRACT

A symbol definition system for a programmable machine controller (PMC) for defining symbols (signal names) in a sequence program of the PMC. Since the function of the signals between the PMC and a numerical control apparatus is fixed, a first group of symbols is supplied to a program creation unit as system data, and therefore, when a sequence program is created, the first group of symbols need not be defined. Further, the first group of symbols is transferred to the PMC together with the sequence program and used for editing and maintenance.

10 Claims, 3 Drawing Sheets

SYMBOL DEFINITION SYSTEM AND METHOD A PROGRAMMABLE MACHINE CONTROLLER

TECHNICAL FIELD

The present invention relates to a symbol definition system and method for a programmable machine controller (PMC) for defining symbols (signal names) in the sequence programs of the PMC, and more particularly, to a symbol definition system for a PMC in the sequence program created by a ladder type of language.

BACKGROUND ART

A sequence program for a PMC contained in a numerical control apparatus and controlling a machine tool is created by a program creation unit, referred to as an off-line programmer, and is transferred to the PMC and controls the machine tool together with the numerical control apparatus.

The sequence program provides symbols (signal names) with signals for creating, debugging and maintaining the program, and usually, these symbols are defined by a machine tool builder at the same time as when creating the sequence program.

These symbols are classified into two types: a first type comprising of a first group of symbols for the interface signals between the PMC and the numerical control apparatus; and a second type comprising of a second group of symbols for the signals between the PMC and the machine tool and for the signals in the PMC. These two types of symbols are conventionally defined when the sequence program is created.

The first group of symbols, however, is fixed by a numerical control apparatus and the same symbols are generally used to create different sequence programs, because the function of these signals does not change even if a sequence program is changed, from the standpoint of the numerical control apparatus. Consequently, a problem arises in the fact that defining the first group of symbols when a sequence program is created is labor-consuming and leads to problems during maintenance, because a different symbol may be given to a signal having a similar function.

SUMMARY OF THE INVENTION

Taking the above into consideration, an object of the present invention is to provide a symbol definition system for a PMC by which the group of symbols for signals between a PMC and a numerical control apparatus is supplied as system data, to thereby reduce the labor needed for defining the symbols.

To attain the above object, according to the present invention, there is provided a symbol definition system for a programmable machine controller (PMC) for defining symbols (signal names) in the sequence program of the PMC, which comprises the steps of supplying a first group of symbols for the interface signals between a numerical control apparatus and said PMC to a program creation unit as system data, defining a second group of symbols for the interface signals between said PMC and a machine tool and for the signals in said PMC by the program creation unit, and transferring the first group of the symbols and said second group of symbols to the PMC together with said sequence program.

Since the function of the signals between the PMC and the numerical control apparatus is fixed, the first group of symbols is supplied to program creation unit as system data, and therefore, when the sequence program is created, the first group of symbols need not be defined. Further, the first group of symbols is transferred to the PMC together with the sequence program, and used for editing and maintenance.

DETAILED DESCRIPTION OF THE INVENTION

An embodiment of the present invention will be described below with reference to the drawings.

Figure 1:
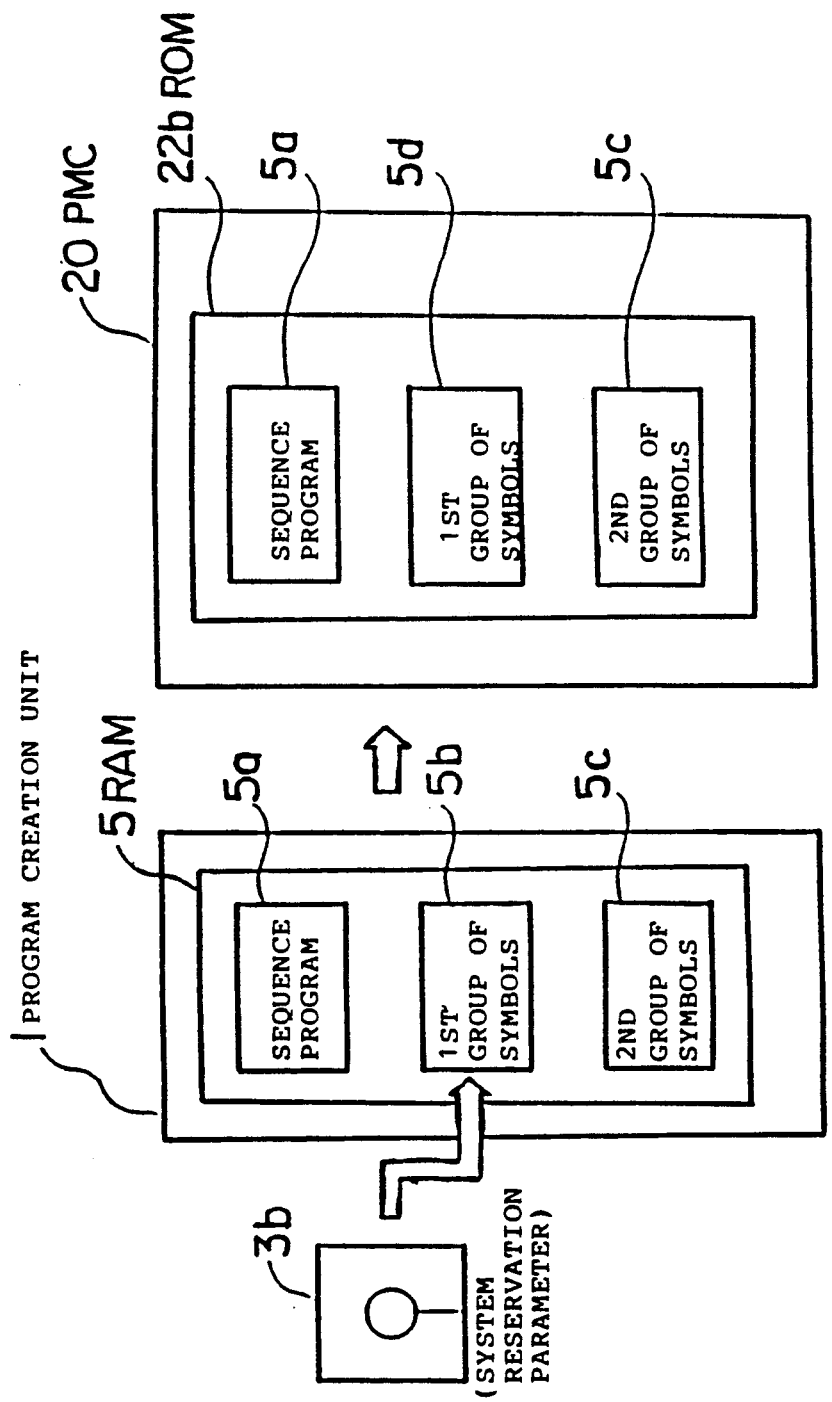
FIG. 1 is a conceptual view of a symbol definition system for a PMC according to the present invention.

FIG. 1 is a schematic block diagram of a symbol definition system for a PMC according to the present invention. A floppy disk $3b$ stores a first group of symbols for signals transferred between a PMC 20 and a numerical control apparatus, termed system reservation symbols, which are read into a program creation unit 1 and stored in a RAM 5 as a first group of symbols $5b$. Consequently, the first group of symbols $5b$ transferred between the PMC 20 and the numerical control apparatus need not be defined. The program creation unit 1 creates a sequence program $5a$ and defines the symbols for the signals transferred between the PMC 20 and a machine tool and for the signals in the PMC 20, i.e., a second group of symbols $5c$.

When the program creation unit 1 has created and edited the sequence program $5a$, the program creation unit 1 writes the sequence program $5a$ to the ROM $22b$ and the ROM $22b$ is mounted on the PMC 20. Alternatively, the sequence program $5a$ may be transferred to the RAM of the PMC 20, to be debugged on the PMC 20 side and then written to the ROM $22b$.

Nevertheless, only the symbols $5d$ of the first group of symbols $5b$ which are referred to by the sequence program $5a$, and the second group of symbols transferred, and the symbols other than the above are not necessary because they are not used in the sequence program $5a$, and thus the capacity of the ROM $22b$ of the PMC can be reduced accordingly. Therefore, the number of symbols $5d$ of the first group $5b$ in the ROM $22b$ is smaller than of the first group of symbols $5b$ in the RAM 5.

Figure 2:
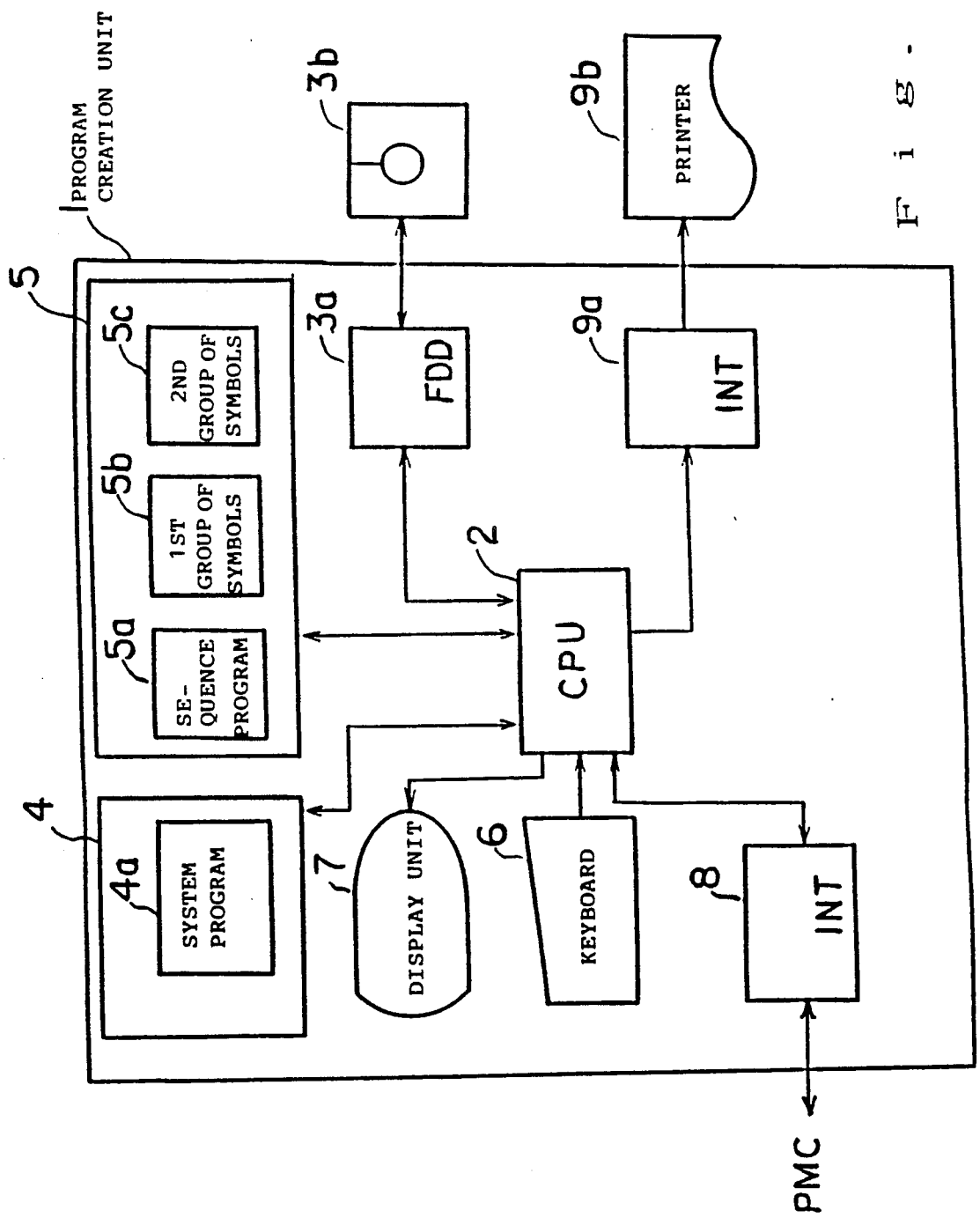
FIG. 2 is a block diagram of a program creation unit embodying the present invention.

FIG. 2 is a block diagram of a program creation unit embodying the present invention. The program creation unit 1 comprises a processor (CPU) 2 as a central component thereof, and a memory 4, in which a system program $4a$ is stored, and a RAM 5 are connected to the processor 2. The RAM 5 stores the sequence program $5a$, and the first group of symbols $5b$ which are read thereto from the floppy disk $3b$ through a floppy disk drive FDD $3a$. Further, the RAM 5 stores the second group of symbols $5c$ for the signals between the PMC 20 and the machine tool and for the signals in the PMC 20.

The sequence program $5a$ is input from a keyboard 6, displayed at a display unit 7 when necessary, and printed out by a printer $9b$, through a printer interface $9a$, if required. Although the sequence program $5a$ is created by a ladder language, another high level language such as PASCAL or the like may be used.

The sequence program 5a, the first group of symbols 5b and the second group of the symbols 5c in the RAM 5 are transferred to the PMC 20; i.e., are written to the ROM 22b, FIG. 1, and the ROM 22b then is mounted on the PMC 20 and further, may be transferred to the RAM 23 of the PMC 20 through an interface 8 and written to the ROM 22b of the PMC 20 after having been debugged at the PMC 20. As described above, however, only the symbols 5d of the first group of symbols 5b, referred to in the sequence program 5a, as well as the sequence program 5a and the second group of symbols 5c, are transferred.

Figure 3:
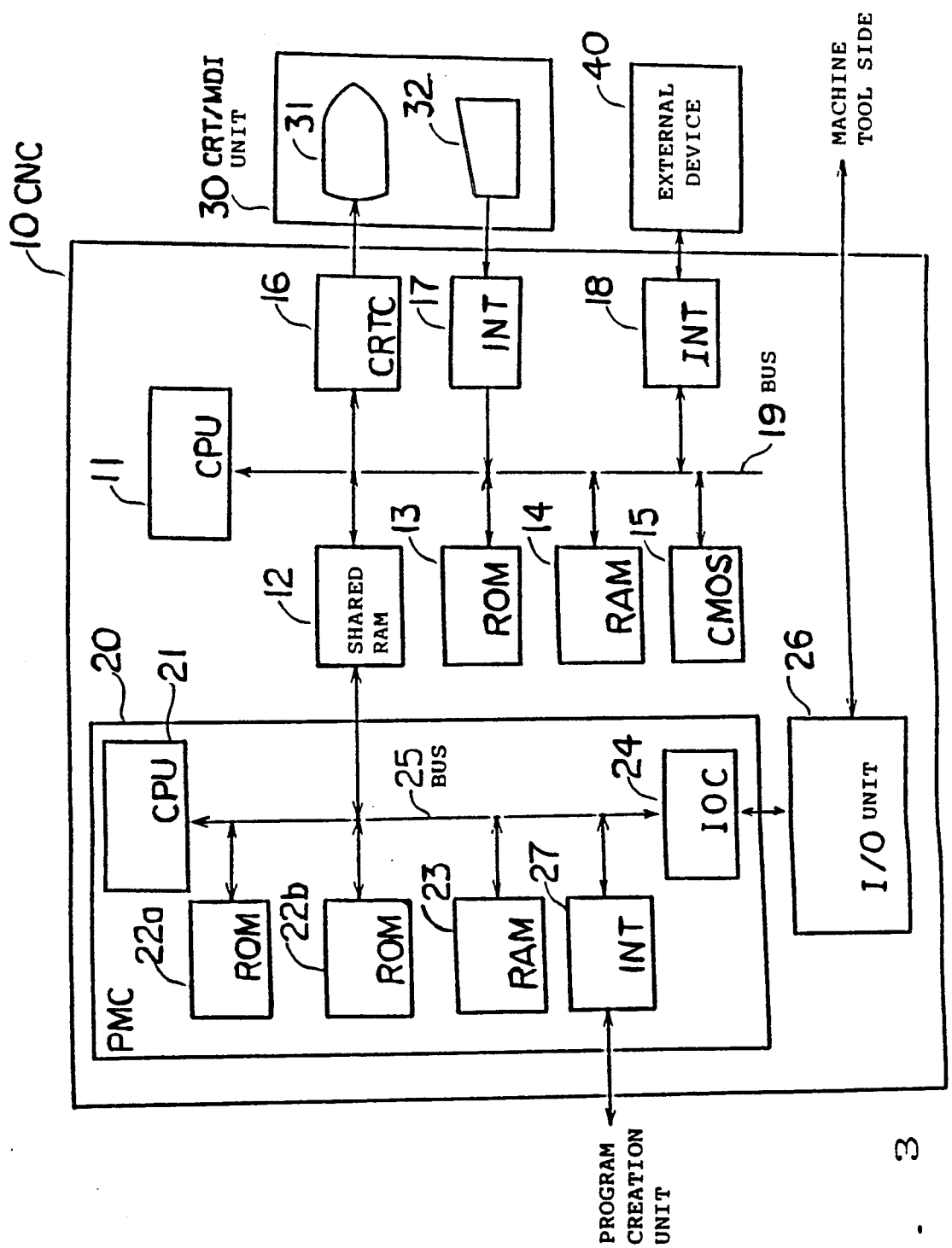
FIG. 3 is a partial block diagram of a numerical control apparatus containing a PMC embodying the present invention.

FIG. 3 is a partial block diagram of a numerical control apparatus containing a PMC embodying the present invention. The programmable machine controller (PMC) 20 is contained in a numerical control apparatus (CNC) 10. A processor 11, which serves as a central component for controlling the numerical control apparatus (CNC) 10 as a whole, Leads a system program stored in a ROM 13 through a bus 19 and controls the numerical control apparatus (CNC) 10 as a whole in accordance with the system program. A shared RAM 12 exchanges data between the CNC 10 and the PMC 20 and stores data which must be simultaneously accessed from both.

A RAM 14 stores temporary calculation data, display data and the like. A CMOS 15 is composed of a non-volatile memory and stores amounts of tool correction and pitch error correction, machining programs, parameters and the like. The CMOS 15 must be maintained operative even after the power supply of the numerical control apparatus (CNC) 10 is cut off, and therefore, the CMOS 15 is a non-volatile memory, and thus power is supplied to the CMOS 15 by a back-up battery (not shown). The CMOS 15 also stores parameters and the like, needed by the PMC 20.

A graphic control circuit 16 converts digital data of the present position of each axis, alarm, parameters, image data and the like into image signals, and outputs same, and the image signals are transferred to the display unit 31 of a CRT/MDI unit 30 and displayed thereat. An interface 17 receives data from a keyboard 32 in the CRT/MDI unit 30 and supplies same to the processor 11.

An interface 18 is used for communication with external devices and is connected to an external device 40 such as a paper tape reader, a paper tape puncher, a paper tape reader/puncher, a printer and the like. A machining program is read from the paper tape reader, and further, a machining program edited in the numerical control apparatus (CNC) 10 is output to the paper tape puncher.

The elements such as the shared RAM 12, ROM 13 and the like are interconnected to the processor 11 through a bus 19.

An axes control circuit for controlling servo motors and the like, servo amplifiers, a spindle control circuit, spindle amplifiers, an interface for a manual pulse generator and the like, are not shown in FIG. 3.

The programmable machine controller (PMC) 20 is provided with a processor 21 for the PMC which is connected to the shared RAM 12 by a bus 25, and the shared RAM 12 is connected to the bus 19 of the CNC 10.

Further, ROMs 22a and 22b are connected to bus 25. The ROM 22a stores a management program for managing the execution of the sequence program 5a and the ROM 22b stores the sequence program 5a, the symbols 5d of first group of symbols 5b, which are referred to by the sequence program 5a, and the second group of the symbols 5c transferred from the program creation unit 1. The sequence program 5a is generally created by a ladder language but may be created by a high level language such as PASCAL or the like. Further, an interface for a ROM cassette may be provided instead of the ROM 22b and the ROM cassette may store the sequence program 5a which has been edited, the symbols 5d of the first group of the symbols 5b and the second group of symbols 5c, and be connected to the interface for the ROM cassette. With this arrangement, the sequence program 5a can be simply improved and modified.

Further, a RAM 23 is connected to the bus 25 and used as a working RAM necessary for the operation of the PMC 20. In addition, the sequence program 5a and the like from the program creation unit 1 may be transferred and edited in the PMC 20. The sequence program 5a is edited by using the display unit 31 of the CRT/MDI unit 30 and the keyboard 32. The RAM 23 also stores I/O signals.

An I/O control circuit 24 is connected to the bus 25, converts output signals stored in the RAM 23 into serial signals, and supplies same to an I/O unit 26. Further, the I/O control circuit 24 converts serial input signals from the I/O unit 26 to parallel signals and supplies same to the bus 25. These signals are stored in the RAM 23 by the processor 21.

The processor 21 of the PMC 20 receives command signals such as an M function command, a T function command and the like from the CNC 10 through the shared RAM 12, temporarily stores these signals in the RAM 23, processes the commands in accordance with the sequence program 5a stored in the ROM 22b, and outputs same to the I/O unit 26 through the I/O control circuit 24. These output signals control hydraulic units, pneumatic units, and magnetic units of a machine tool.

Further, the processor 21 receives input signals such as a limit switch signal of the machine tool, a signal of the operation switch on a machine control panel and the like supplied from the I/O unit 26, and temporarily stores these input signals in the RAM 23. Input signals not required to be processed by the PMC 20 are transferred to the processor 11 through the shared RAM 12; other signals are processed by the sequence program 5a and a part thereof is output to the numerical control apparatus, and the remaining signals are output as an output signal from the I/O unit 26 to the machine tool through the I/O control circuit 24.

The sequence program 5a stored in the RAM 23 or ROM 22b can be displayed at the display unit 31 of the CRT/MDI unit 30 and corrected by the keyboard 32.

As described above, according to the present invention, since the first group of symbols for the signals between the PMC and the numerical control apparatus is prepared as the system data, it is necessary only to define the second group of symbols for the signals between the PMC and the machine tool and for the signals in the PMC when the sequence program is created, whereby the definition of the symbols is simplified.

Further, since the first group of symbols for the signals between the PMC and the numerical control apparatus is fixed, the numerical control apparatus can be more easily maintained.

We claim:

1. A symbol definition method for defining symbols in a sequence program of a programmable machine controller, said symbol definition method comprising the steps of:

supplying a first group of symbols, for respective first interface signals between a numerical control apparatus and said programmable machine controller, to a program creation unit as system data;

defining, in said program creation unit, a second group of symbols for respective second interface signals between said programmable machine controller and a machine tool and respective information signals used in said programmable machine controller;

creating said sequence program, having selected ones of said first group of symbols and selected ones of said second group of symbols, in said program creation unit; and transferring symbols of said first group of symbols and said second group of symbols, together with said sequence program, from said program creation unit to said programmable machine controller.

2. A symbol definition method according to claim 1, further comprising:

transferring only said selected ones of said first group of symbols which are referred to by said sequence program, said second group of symbols and said sequence program from said program creation unit to said programmable machine controller.

3. A symbol definition method according to claim 1, further comprising:

creating said sequence program by a ladder type of programming language.

4. A symbol definition method according to claim 1, further comprising:

supplying said first group of symbols to said program creation unit through a floppy disk.

5. A symbol definition device used with a numerical control apparatus and a machine tool, for defining symbols indicating signal names in a sequence program, said symbol definition device comprising:

a programmable machine controller controlling various operations of the machine tool; and a program creation unit connected to said programmable machine controller, storing a first group of said symbols related to respective first interface signals between said numerical control apparatus and said programmable machine controller, said program creation unit storing a second group of said symbols related to respective second interface signals between said programmable machine controller and said machine tool, and respective data signals used within said programmable machine controller, defining only said second group of said symbols, generating said sequence program comprising selected ones of said first and second groups of said symbols and transferring said sequence program, said second group of said symbols, and only said selected ones of said first group of said symbols to said programmable machine controller.

6. The symbol definition device as claimed in claim 5, wherein said program creation unit comprises:

a first processor for controlling operation of said program creation unit;

a first memory storing a system program used to control the numerical control apparatus; and a second memory storing said sequence program and said first and second groups of said symbols.

7. The symbol definition device as claimed in claim 6, wherein said programmable machine controller comprises:

a third memory storing a management program for managing execution of said sequence program;

a fourth memory storing said sequence program, said second group of said symbols and said selected ones of said first group of said symbols referred to by said sequence program; and a fifth memory storing input/output signals, and controlling operation of said programmable machine controller.

8. The symbol definition device as claimed in claim 7, wherein said numerical control apparatus comprises:

said programmable machine controller;

a sixth memory storing said system program;

a second processor reading said system program stored in said sixth memory;

a shared memory exchanging data between said numerical control apparatus and said programmable machine controller;

a seventh memory storing calculation data and display data; and a non volatile memory storing amounts of tool correction and pitch error correction, machining programs and parameters, and being operative even after power is cut off from said numerical control apparatus.

9. The symbol definition device as claimed in claim 8, wherein said programmable machine controller further comprises:

a third processor receiving command signals from said numerical control apparatus through said shared memory, temporarily storing said command signals in said third memory, processing said command signals in accordance with said sequence program stored in said fourth memory, and outputting said processed command signals to said input-/output control circuit.

10. A symbol definition method for defining symbols in a sequence program of a programmable machine controller, said symbol definition method comprising the steps of:

supplying a first group of symbols, for respective first interface signals between a numerical control apparatus and said programmable machine controller, to a program creation unit as system reservation symbols;

defining, in said program creation unit, a second group of symbols for respective second interface signals between said programmable machine controller and a machine tool, and respective information signals used in said programmable machine controller;

creating said sequence program, comprising selected ones of said first group of symbols and selected ones of a second group of symbols, in said program creation unit; and transferring only said selected ones of said first group of symbols, said second group of symbols and said sequence program from said program creation unit to said programmable machine controller.

* * * * *

UNITED STATES PATENT AND TRADEMARK OFFICE
CERTIFICATE OF CORRECTION

PATENT NO. : 5,331,540
DATED : July 19, 1994
INVENTOR(S) : Kunio TANAKA et al.

It is certified that error appears in the above-indentified patent and that said Letters Patent is hereby corrected as shown below:

On the title page, item [54] and in column 1, line 1, in the title, second line, after "METHOD" insert --FOR--;

Insert PCT Information:

--PCT Filed: March 7, 1991

PCT No.: PCT/JP91/00329

§371 Date: November 13, 1991

§102(e) Date: November 13, 1991

Column 1, line 29, delete "of";

line 63, delete "the" and "said";

line 64, "said" should be --the--.

UNITED STATES PATENT AND TRADEMARK OFFICE
CERTIFICATE OF CORRECTION

PATENT NO. : 5,331,540
DATED : July 19, 1994
INVENTOR(S) : Kunio TANAKA et al.

It is certified that error appears in the above-indentified patent and that said Letters Patent is hereby corrected as shown below:

Column 2, line 43, after "5b" insert --,--;

line 44, after "symbols" insert --are--;

line 50, after "than" insert --the number--.

Column 3, line 2, delete "the" (second occurrence);

line 19, "Leads" should be --reads--.

Column 4, line 10, delete "the" (second occurrence);

line 23, delete "is".

Signed and Sealed this

First Day of November, 1994

Attest:

BRUCE LEHMAN

Attesting Officer                    Commissioner of Patents and Trademarks